(12) United States Patent
Sugiura

(10) Patent No.: US 7,777,968 B2
(45) Date of Patent: Aug. 17, 2010

(54) PHOTOGRAPHING LENS DRIVING CONTROL APPARATUS

(75) Inventor: Koichi Sugiura, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 75 days.

(21) Appl. No.: 12/281,091

(22) PCT Filed: Mar. 12, 2007

(86) PCT No.: PCT/JP2007/055323

§ 371 (c)(1),
(2), (4) Date: Aug. 28, 2008

(87) PCT Pub. No.: WO2007/105813

PCT Pub. Date: Sep. 20, 2007

(65) Prior Publication Data

US 2009/0034095 A1   Feb. 5, 2009

(30) Foreign Application Priority Data

Mar. 13, 2006   (JP) ............................... 2006-067144

(51) Int. Cl.
*G02B 15/14* (2006.01)
*G02B 7/02* (2006.01)
*G02B 17/00* (2006.01)

(52) U.S. Cl. ................. 359/697; 359/694; 359/822; 359/824; 396/77

(58) Field of Classification Search ......... 359/694–701, 359/819–824; 348/347, 358; 396/77–133
See application file for complete search history.

(56) References Cited

U.S. PATENT DOCUMENTS 6,169,578 B1 * 1/2001 Chigira ..................... 348/347

7,609,957 B2 * 10/2009 Sugiura ..................... 396/86
2001/0009443 A1   7/2001 Suemoto et al.
2006/0011610 A1   1/2006 Kondou et al.
2006/0017836 A1   1/2006 Nuno et al.
2006/0188242 A1   8/2006 Sugiura

FOREIGN PATENT DOCUMENTS

| EP | 0679918 | 11/1995 |
| EP | 1 736 809 A3 | 12/2006 |
| EP | 1 767 976 A3 | 3/2007 |
| JP | 06-14231 | 1/1994 |
| JP | 06-160699 | 6/1994 |
| JP | 2000-275503 | 10/2000 |
| JP | 2004279709 | 10/2004 |
| JP | 2006-106542 | 4/2006 |

(Continued)

*Primary Examiner*—Mohammed Hasan
(74) *Attorney, Agent, or Firm*—Dickstein Shapiro LLP

(57) ABSTRACT

A photographing lens driving control apparatus includes a plurality of lens groups constituting a zooming optical system including a lens group (1A) on an object side and a lens group (1B) on an imaging side, a plurality of tens driving device (4A, 4B, 4C) configured to drive the plurality of tens groups, respectively, and a control device (5B) configured to control the plurality of lens driving devices; the control device (5B) adjusts a driving speed of the lens group on the object side according to a position of the lens group on the imaging side relative to a position of the lens group on the object side, when driving the lens group on the object side.

12 Claims, 13 Drawing Sheets

FOREIGN PATENT DOCUMENTS

| | | |
|---|---|---|
| JP | 2006-227399 | 8/2006 |
| JP | 2006-330657 | 12/2006 |
| JP | 2007-3612 | 1/2007 |
| JP | 2007-86687 | 4/2007 |
| WO | WO 2006/011610 A1 | 2/2006 |

* cited by examiner

FIG.2

| | Zp1 WIDE-ANGLE | Zp2 | Zp3 | Zp4 | Zp5 | Zp6 | Zp7 | Zp8 | Zp9 | Zp10 | Zp11 | Zp12 | Zp13 | Zp14 | Zp15 | Zp16 | Zp17 TELEPHOTO |
|---|---|---|---|---|---|---|---|---|---|---|---|---|---|---|---|---|---|
| FIRST-SECOND GROUP | 500 | 580 | 660 | 740 | 820 | 900 | 980 | 1060 | 1140 | 1220 | 1300 | 1380 | 1460 | 1540 | 1620 | 1700 | 1780 |
| THIRD GROUP | 300 | 320 | 340 | 360 | 380 | 400 | 420 | 440 | 460 | 480 | 500 | 520 | 540 | 560 | 580 | 600 | 620 |

PHOTOGRAPHING LENS DRIVING CONTROL APPARATUS

TECHNICAL FIELD

The present invention relates to a photographing lens driving control apparatus.

BACKGROUND ART

A camera for taking a picture, which includes a so-called zoom lens capable of varying a photographing magnification according to need, is widely distributed. With this zoom lens, the photographing magnification can be varied between a telephoto state capable of photographing a distance at a magnification and a wide-angle state capable of photographing a wide area by means of operation switches provided in the camera. In order to vary the photographing magnification as described above, a plurality of lens groups each having at least one lens is combined, and each of the lens groups is driven in the optical axis direction of the lens groups. A camera for taking a picture, which includes a so-called zoom lens capable of varying a photographing magnification according to need, is widely distrusted. With this zoom lens, the photographing magnification can be varied between a telephoto state capable of photographing a distance at a magnification and a wide-angle state capable of photographing a wide area by means of operation switches provided in the camera. In order to vary the photographing magnification as described above, a plurality of lens groups each having at least one lens is combined, and each of the lens groups is driven in the optical axis direction of the lens groups.

When driving the above lens groups, a method of driving a mechanical mechanism, which can change a position of each of the lens groups in conjunction with each other, by means of hand or a motor is generally used (for example, reference to H06-160699A).

DISCLOSURE OF THE INVENTION

Such a photographing lens driving control apparatus, however, has an issue that its structure becomes complicated by the mechanical mechanism. With respect to the photographing lens driving control apparatus, a photographing lens driving control apparatus which directly drives lens groups by motors, respectively, is considered, allowing the structure to be easier than the mechanical structure.

However, because these lens groups are provided on the same optical axis, each of the lens groups may interfere when each of the lens groups is independently driven back and forth along the optical axis.

When sequentially driving each of the lens groups at different times, it takes time to establish appropriate positional relationship of lens groups of a target optical system.

Accordingly, if the above photographing lens driving control apparatus is applied for a digital camera, a video camera or the like each having a liquid crystal display, an out of focus image is displayed on the liquid crystal display for a long time because an image via a normal lens is displayed on the liquid crystal display, causing an undesired image on the liquid crystal display.

It is, therefore, an object of the present invention to provide, in a photographing lens including a plurality of lens groups, a photographing lens driving control apparatus, which simultaneously drives lens groups by motors, respectively, without causing the interference between each of the lens groups, and establishes a target optical system at short times.

In order to achieve the above object, one aspect of the invention involves a photographing lens driving control apparatus, comprising: a plurality of lens groups constituting a zooming optical system including a lens group on an object side and a lens group on an imaging side; a plurality of lens driving device configured to drive the plurality of lens groups, respectively; and a control device configured to control the plurality of lens driving devices, wherein the control device adjusts a driving speed of the lens group on the object side according to a position of the lens group on the imaging side relative to a position of the lens group on the object side, when driving the lens group on the object side.

Preferably, the control device sets a first predetermined position on the object side and sets a second predetermined position on the imaging side regarding moving positions of the lens group on the object side and the lens group on the imaging side, so as to set a group interval retaining zone of the lens group on the object side and the lens group on the imaging side between the first predetermined position and the second predetermined position; the control device adjusts the driving speed of the lens group on the object side such that the lens group on the object side does not further come close to the lens group on the imaging side, in which case the lens group on the imaging side comes close to the lens group on the object side when the lens group on the object side is located on the object side beyond the first predetermined position; and the control device adjusts the driving speed of the lens group on the object side such that the lens group on the imaging side does not further depart from the lens group on the object side, in which case the lens group on the imaging side is located on the imaging side beyond the second predetermined position.

Advantageously, the driving speed of the lens group on the object side is adjusted by varying driving voltage for driving the lens driving device.

In a preferred embodiment, the control device increases driving voltage of the lens driving device of the lens group on the object side in which case the lens group on the imaging side comes close to the lens group on the object side beyond a first predetermined position and lowers the driving voltage of the lens driving device of the lens group on the object side in which case the lens group on the imaging side is moved on the imaging side beyond a second predetermined position, when driving the lens group on the object side from the imaging side to the object side; the control device lowers the driving voltage of the lens driving device of the lens group on the object side in which case the lens group on the imaging side comes close to the lens group on the object side beyond the first predetermined position and increases the driving voltage of the lens driving device of the lens group on the object side in which case the lens group on the imaging side departs from the lens group on the object side to the imaging side beyond the second predetermined position, when driving the lens group on the object side from the object side to the imaging side.

Advantageously, the driving speed of the lens group on the object side is adjusted by varying a duty driving ratio of the lens driving device.

Preferably, the control device increases a duty driving ratio of the lens driving device of the lens group on the object side in which case the lens group on the imaging side comes close to the lens group on the object side beyond a first predetermined position and lowers a duty driving ratio of the lens driving device of the lens group on the object side in which case the lens group on the imaging side departs from the lens group on the object side beyond a second predetermined position, when driving the lens group on the object side to the object side; and the control device lowers the duty driving ratio of the lens driving device of the lens group on the object side in which case the lens group on the imaging side comes close to the lens group on the object side beyond the first predetermined position and increases the duty driving ratio of the lens driving device of the lens group on the object side in which case the lens group on the imaging side departs from the lens group on the object side beyond the second predetermined position, when driving the lens group on the object side to the imaging side.

In a preferred embodiment, the control device increases a driving voltage of the lens driving device of the lens group on the object side in which case the lens group on the imaging side comes close to the lens group on the object side beyond a first predetermined position and lowers a duty driving ratio of the lens driving device of the lens group on the object side in which case the lens group on the imaging side departs from the lens group on the object side beyond a second predetermined position, when driving the lens group on the object side to the object side; and the control device lowers the driving voltage of the lens driving device of the lens group on the object side in which case the lens group on the imaging side comes close to the lens group on the object side beyond the first predetermined position and increases the duty driving ratio of the lens driving device of the lens group on the object side in which case the lens group on the imaging side departs from the lens group of the object side beyond the second predetermined position, when driving the lens group on the object side to the imaging side.

Advantageously, the control device increases a driving voltage or a duty driving ratio of the lens driving device of the lens group on the object side in which case the lens group on the imaging side comes close to the lens group on the object side beyond a first predetermined position and lowers the driving voltage or the duty driving ratio of the lens driving device of the lens group on the object side in which case the lens group on the imaging side departs from the lens group on the object side beyond a second predetermined position, when driving the lens group on the object side to the object side; and control device lowers the driving voltage or the duty driving ratio of the lens driving device of the lens group on the object side in which case the lens group on the imaging side comes close to the lens group on the object side beyond the first predetermined position and increases the driving voltage or the duty driving ratio of the lens driving device of the lens group on the object side in which case the lens group on the imaging side departs from the lens group on the object side beyond the second predetermined position, when driving the lens group on the object side to the imaging side.

Preferably, the control device increases a driving voltage and a duty driving ratio of the lens driving device of the lens group on the object side in which case the lens group on the imaging side comes close to the lens group on the object side beyond a first predetermined position and lowers the driving voltage and the duty driving ratio of the lens driving device of the lens group on the object side in which case the lens group on the imaging side departs from the lens group on the object side beyond a second predetermined position, when driving the lens group on the object side to the object side; and control device lowers the driving device voltage and the duty driving ratio of the lens driving device of the lens group on the object side in which case the lens group on the imaging side comes close to the lens group on the object side beyond the first predetermined position and increases the driving voltage and the duty driving ratio of the lens driving device of the lens group on the object side in which case the lens group on the imaging side departs from the lens group on the object side beyond the second predetermined position, when driving the lens group on the object side to the imaging side.

In one embodiment, the lens driving device of the lens group on the object side is a direct current motor and the lens driving device of the lens group on the imaging side is a pulse motor.

BRIEF DESCRIPTION OF THE DRAWINGS

FIG. 2 is a table showing positional information of lenses according to the first to fourth embodiments of the present invention.

DESCRIPTION OF NUMERALS

1 Photographing lens
1A First-second group
1B Third group
1C Fourth group
2A First aperture stop
2B Second aperture stop
3 Shutter
4A First-second group motor
4B Third group motor
4C Fourth group motor 5 Control device
6A Telephoto SW
6B Wide-angle SW

BEST MODE FOR CARRYING OUT THE INVENTION

Hereinafter, embodiments according to the best mode of the present invention will be explained with reference to the drawings.

First Embodiment

Figure 1:
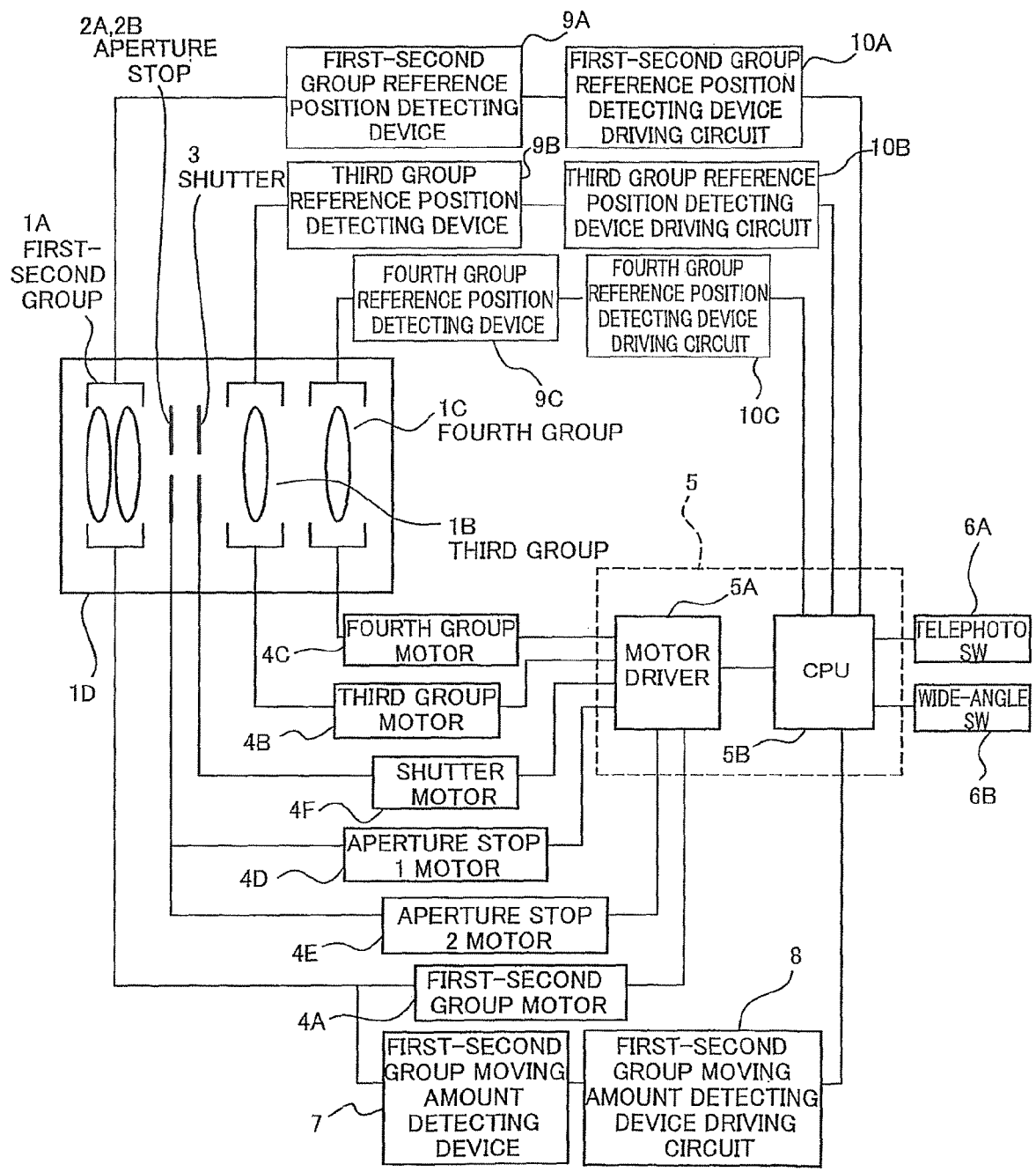
FIG. 1 is a block diagram showing a camera according to first to fourth embodiments of the present invention.

FIG. 1 is a view illustrating a block diagram of the first embodiment of the present invention.

A photographing lens 1 includes a first-second group 1A (lens groups on an object side) each having a plurality of lenses, a third group 1B (another lens group) and a fourth lens group 1C. These lens groups 1A-1C are disposed in a lens barrel 1D such that each of the central axes is provided on the same optical axis. In this case, a first aperture stop 2A and a second aperture stop 2B for controlling light volume which enters in the photographing lens 1 from a photographing object and a shutter 3 for controlling an exposure time during photographing are disposed between the first-second group 1A and the third group 1B.

In this case, the first-second group 1A and the third group 1B are lens groups for varying a photographing magnification, and the fourth group 1C is a lens group for focusing an image onto an exposure surface (not shown) positioned back of the fourth group 1C.

The first-second group 1A of lens group on the object side, the third group 1B and the fourth group 1C of other lens groups are driven by motors, respectively, and establish a target optical system by moving in parallel to the optical axis. A first-second group motor 4A is a DC motor, a third group motor 4B and a fourth group motor 4C are pulse motors, respectively (driving mechanism are not shown).

A DC motor generally has a rotation speed faster than that of a pulse motor if supply capability is the same. In addition, the DC motor has a feature that the driving current varies as the load varies. Accordingly, if the load is increased, the driving current is increased, as a result, the driving torque is increased; thus, the DC current is strong in the load variation. Therefore, the DC motor is suitable for driving the cam tube that its inclination varies by a zoom position, i.e., the load of DC motor varies. At the same time, when stopping the DC motor, a gap from the start of stop control to the actual stop, so-called overrun is developed by the inertia; thus, it is difficult to stop the motor in a desired position. On the other hand, since a pulse motor is driven by pulses, it is easy to stop the motor in an arbitrary position, but it is not strong in torque variation; thus, the pulse motor is suitable for the control when the torque is unlikely to vary.

In addition, the first aperture stop 1A, second aperture stop 2B and shutter 3 are driven by a first aperture stop motor 4D, a second aperture stop motor 4E and a shutter motor 4F (driving mechanisms are not shown). Each of the motors 4A-4F is electrically connected to the motor driver 5A.

The motor driver 5A obtains information necessary for controlling the driving of each motor 4A-4F, for example, driving voltage, driving timing, driving volume and driving direction from a CPU 5B (control device) electrically connected to the motor driver 5A, so as to perform the driving control of each of the motors 4A-4F.

In this case, the motor 4A includes a first-second group moving amount detecting device 7 for generating pulses according to the number of rotations along the rotation of motor. The first-second group moving amount detecting device 7 is driven by a first-second group moving amount detecting device driving circuit 8 electrically connected thereto. The pulses output from the first-second group moving amount detecting device 7 are loaded into the CPU 5B.

Figure 13:
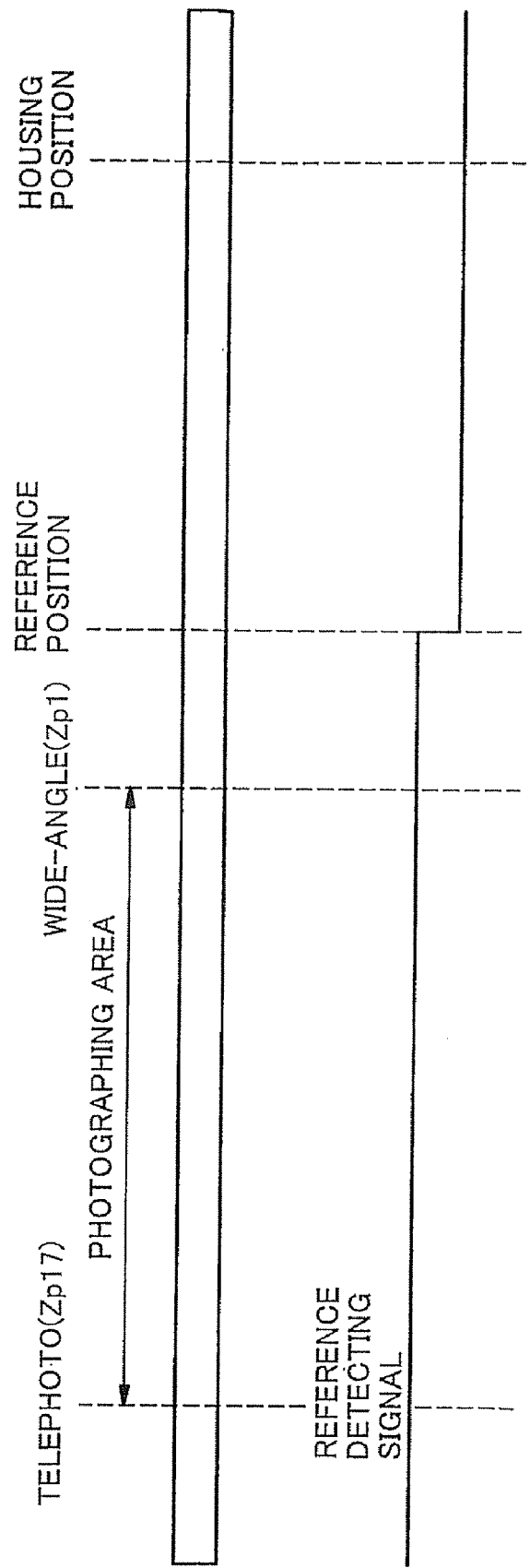
FIG. 13 is an explanation view illustrating a relationship between a reference position and a zoom position.

The first-second group moving amount detecting device 7 outputs the predetermined number of pulses, for example, 1280 pulses between the telephoto end state and the wide-angle end state of the photographing lens 1. This interval is divided into predetermined numbers, for example, 16 (80 pulses each), and 17 positional indicators, so-called zoom positions Zp1, ZP2, . . . , Zp17 are set to the interval. FIG. 2 shows relationship between output pulses of first-second group moving amount detecting device 7 and the zoom positions. In addition, FIG. 13 shows positional relationship of a reference zoom position and a housing position. As to the number of pulses shown in FIG. 2, the reference position is counted as 0. The housing position side from the reference position is counted by a negative value.

On the other hand, the third group motor 4B and fourth group motor 4C for driving the third group 1B and the fourth group 1C, respectively, are pulse motors, respectively, and are driven depending on the number of pulses applied from the motor driver 5A according to the instruction from the CPU 5B.

In this case, the number of pulses input to the third group motor 4B necessary for positioning the third group 1B in each of the zoom positions Zp1-Zp17 is set as shown in FIG. 2. In addition, the fourth group 1C is a focusing lens group; thus, the explanation of the position is omitted.

The first-second group 1A, third group 1B and fourth group 1C include a first-second group reference position detecting device 9A, a third group reference position detecting device 9B and a fourth group reference position detecting device 9C, respectively. Each of the reference position detecting devices 9A, 9B, 9C is configured to detect whether a lens group is in a reference position. The first-second group reference position detecting device 9A, the third group reference position detecting device 9B and the fourth group reference position detecting device 9C are driven by a first-second group reference position detecting device driving circuit 10A, a third group reference position detecting device driving circuit 10B and a fourth group reference position detecting device driving circuit 10C, respectively. The positions are loaded into the CPU 5B.

A telephoto switch 6A (telephoto SW in FIG. 1) for increasing the magnification of photographing lens 1 when conducting telephoto photographing and a wide-angle switch 6B (wide-angle SW in FIG. 1) for decreasing the magnification of photographing lens 1 when conducting wide-angle photographing are electrically connected to the CPU 5B. The CPU 5B controls each of the motors 4A, 4B, 4C according to the operation of the telephoto switch 6A and wide-angle switch 6B. The above motor driver 5A and the CPU 5B constitute a control device 5.

The first group and the second group comprising the first-second group 1A are disposed in a cam tube (not shown) that the interval thereof is mechanically adjusted by a cam mechanism. The cam tube is mechanically driven such that the interval between the first group and the second group becomes a predetermined interval when the first-second group 1A is driven by the first-second group motor 4A.

Next, basic performance of the first embodiment of the present invention will be described with reference to the flow chart in FIG. 3, the timing charts in FIGS. 4-7 and the performance explanation view in FIG. 8.

The present embodiment shows a driving control method which changes driving speed by increasing and decreasing the driving voltage of first-second group 1A according to the position of the third group 1B relative to the position of first-second group 1A, so as to simultaneously drive the first-second group 1A and the third group 1B such that the first-second group 1A and the third group 1B do not interferer each other.

The control flow of driving control method is different between a situation that the photographing lens 1 is driven in the driving direction from the telephoto end to the wide-angle end and a situation that the photographing lens 1 is driven in the driving direction from the wide-angle end to the telephoto end. Thus, hereinafter, the above two situations are separately explained.

(Driving Control from Wide-Angle End to Telephoto End)

At first, the driving control method when the photographing lens 1 is driven in the driving direction from the wide-angle end to the telephoto end will be described. FIG. 3 shows the zooming performance in this situation.

In step S101, it is determined whether the photographing lens 1 is a situation to be driven in the driving direction from the telephoto end to the wide-angle end or a situation to be driven in the driving direction from the wide-angle end to the telephoto end, so as to determine the need of fourth group retracting driving control.

If a user presses the telephoto switch 6A for driving the photographing lens 1 from the wide-angle end to the telephoto end, so as to drive the photographing lens 1 in the driving direction from the wide-angle end to the telephoto end (WET in FIG. 3), each of the lens groups is driven in the direction that a distance between each of the lens groups increases. Thus, the fourth group 1C retracting driving control is not necessary, and the flow proceeds to step S103.

In step S103, it is determined whether the photographing lens 1 is a situation to be driven in the driving direction from the telephoto end to the wide-angle end or a situation to be driven from the wide-angle end to the telephoto end, so as to determine the need of third group 11B retracting driving control.

If a user presses the telephoto switch 6A for driving the photographing lens 1 from the wide-angle end to the telephoto end, so as to drive the photographing lens 1 in the driving direction from the wide-angle end to the telephoto end (WET in FIG. 3), each of the lens groups is driven in the direction that a distance between each of the lens groups increases. Thus, the third group 1B retracting driving control is not necessary, and the flow proceeds to step S105.

In step S105, the first-second group motor 4A is driven by pressing the telephoto switch 6A to start the driving of first-second group 1A.

Because the first-second group motor 4A is a DC motor, incoming current is generated right after the driving is started. Thereby, the power source voltage is decreased, affecting the battery life. In order to avoid this, start-up control, which sets the driving voltage of first-second group motor 4A right after the start of the driving to a value lower than the driving voltage of stationary time, and raises the voltage to the voltage of stationary time after a predetermined time has passed, is performed (reference to the timing charts of the telephoto switch 6A and the first-second group motor 4A in FIGS. 4, 5).

The driving voltage between the telephoto end and the wide-angle end is set lower than the driving voltage between the wide-angle end and the housing of photographing lens. The voltage between the wide-angle end and the housing of photographing lens is set high because high speed driving is required between the wide-angle end and the housing of photographing lens. On the other hand, the voltage between the telephoto end and the wide-angle end is appropriately set, such that the driving is quickly stopped at a target position by the operation of the telephoto switch 6A or the wide-angle switch 6B.

After the driving of first-second group 1A is started in step S105, the flow proceeds to step S106.

In step S106, it is determined whether it is necessary to stop the first-second group 1A. Here, if it is necessary to stop the first-second group 1A, i.e., if the telephoto switch 6A is not pressed (at the time that the telephoto switch 6A becomes Off in FIG. 5), or if the first-second group 1A is driven to within a predetermined distance relative to the position of the maximum telephoto side (at the time that the stop control of first-second group 1A is started in FIG. 4), the flow proceeds to step S112.

On the other hand, if it is not necessary to stop the first-second group 1A, the flow proceeds to step S107.

In step S107, it is determined whether the third group 1B is being stopped or is being driven. If the third group 1B is being stopped, the flow proceeds to step S108. On the other hand, when the third group 1B is being driven, the flow proceeds to step silo.

In step S108, it is determined whether a predetermined time has passed after the start of driving of the first-second group 1A, in order to provide a time lag between the driving start timing of first-second group 1A and the driving start timing of third group 1B. By providing the time lag between the driving start timing of first-second group 1A and the driving start timing of third group 1B, the driving current of the third group motor 4B does not overlap the incoming current generated at the start of the driving of first-second group motor 4A; thus, it becomes unnecessary for the power source to supply large consumption current in a short period of time. Therefore, the battery life can be extended. The determination of the passing of predetermined time is performed by counting the predetermined number of pulses output from the first-second moving amount detecting device 7.

In step 108, after the start of driving of the first-second group 1A, if the predetermined time has passed, the flow proceeds to step S109. On the other hand, after the start of driving of the first-second group 1A, if the predetermined time has not passed, the flow goes back step S106, and the above flow is repeated.

In step S109, the driving of third group 1B is started by the third group motor 4B. In this case, the driving of third group 1B is performed at a predetermined speed such that input pulse rate of third group motor 4B becomes 600 pps (the number of pulses per second), for example. After that, the flow goes back to step S106.

If the third group 1B is being driven in step S107, the flow proceeds to step S110. In step S110, the position of third group 1B relative to the position of first-second group 1A is found out, and it is determined whether it is necessary to change the driving speed of first-second group 1A so as to avoid the interference and the excessive disjunction between the first-second group 1A and the third group 11B.

Figure 8:
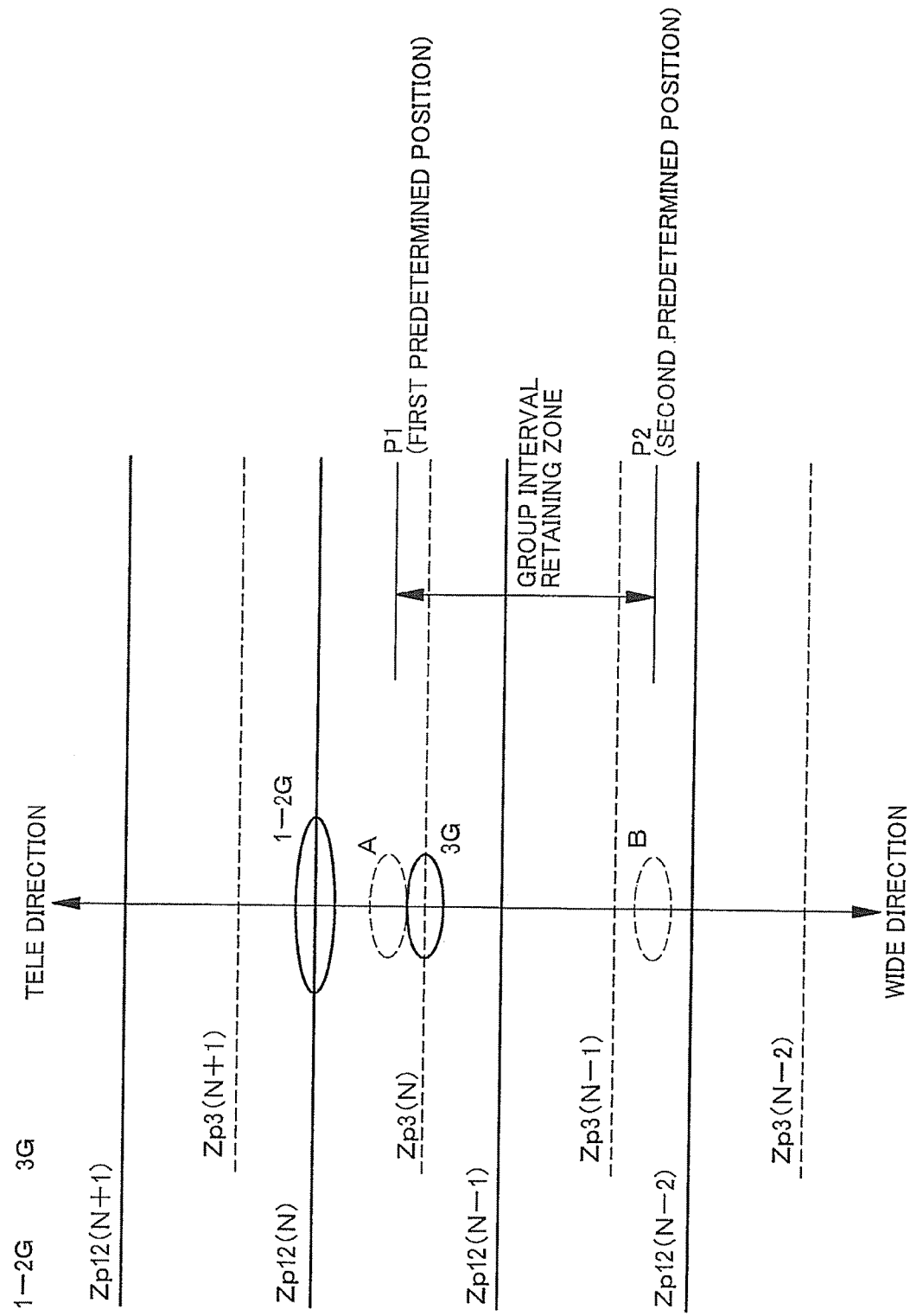
FIG. 8 is an explanation view illustrating a first predetermined position P1 on the object side and a second predetermined position P2 on the imaging side which are positions of the first-second lens group and the third lens group in the optical axis direction.

As shown in FIG. 8, if the position of third group 1B is a state coming close to the position of the first-second group 1A beyond a predetermined position P1 (dotted line portion A in FIG. 8), or if the position of third group 1B is a state departing from the position of the first-second group A1 beyond a predetermined position P2 (dotted line portion B in FIG. 8), it is necessary to change the driving speed of first-second group 1A, and the flow proceeds to step S111. On the other hand, if the position of third group 1B relative to the position of first-second group 1A is between P1 and P2, it is unnecessary to change the driving speed of first-second group 1A, and the flow goes back to step S106. Hereinafter, the distance between P1 and P2 is called a group interval retaining zone.

In step S111, if the position of third group 1B is a state coming close to the position of first-second group 1A beyond the predetermined position P1 (dotted line portion A in FIG. 8), the interference between the first-second group 1A and the third group 1B may be generated; thus, the speed of first-second group 1A is reduced at the predetermined amount so as to avoid the interference between the first-second group 1A and the third group 1B.

In addition, if the position of third group 1B is a state departing from the position of first-second group 1A beyond the predetermined position P2 (dotted line portion B in FIG. 8), the distance between the first-second group 1A and the third group 1B may be excessively increased; thus, the speed of first-second group 1A is increased at the predetermined amount so as to avoid the excessive disjunction between the first-second group 1A and the third group 1B.

As to the acceleration and deceleration amount, an appropriate value is calculated by the CPU 5 based on the driving speed of first-second group 1A, the position of first-second group 1A detected by the first-second group moving amount detecting device 7 and the position of third group 1B calculated by the input pulse of third group motor 4B.

FIG. 8 illustrates a schematic view of positional relationship of the first-second group 1A and the third group 1B. The zoom position $Zp3(N)$ of third group 1B for establishing a predetermined magnification is previously set relative to the zoom position $Zp12(N)$ of first-second group 1A (reference to FIG. 2).

In this case, the position P1 of third group 1B for starting the deceleration of first-second group 1A is closer to the zoom position $Zp3(N+1)$ from the zoom position $Zp3(N)$ of the third group 1B at ⅓ between the zoom position $Zp3(N)$ and the zoom position $Zp3(N+1)$ of the third group 1B, i.e., $P1=Zp3(N)+(Zp3(N+1)-Zp3(N))/3$.

Also, the position P2 of third group 1B for starting the acceleration of first-second group 1A is closer to the zoom position $Zp3(N-2)$ of the third group 1B from the zoom position $Zp3(N-1)$ of third group 1B at ⅓ between the zoom position $Zp3(N-1)$ of third group 1B and the zoom position $Zp3(N-2)$ of third group 1B, i.e., $P2\ Zp3(N-1)-(Zp3(N-1)-Zp3(N-2))/3$.

When the zoom position of third group 1B is $Zp3(4)(N=4)$, if P1 and P2 are expressed by the output pulse to the third group motor 4B shown in FIG. 2, $P1=360+(380-360)/3=336$ $P2=340-(340-320)/3=334$.

More particularly, in the case when the zoom position of first-second group 1A is $Zp(4)$ ($N=4$), if the output pulse to the third group motor 4B becomes 366 and above, the driving speed of first-second group 1A is decelerated, and when the output pulse to the third group motor 4B becomes 344 and below, the driving speed of first-second group 1A is accelerated.

Hereinafter, a method of varying the driving speed of first-second group 1A by the driving voltage of first-second group 1A will be explained.

The first-second group 1A is driven by a normal driving voltage of 2.0V, and confirms the position of third group 1B in Zp basis. If the position of third group 1B becomes the position P1 and above, and the group interval is reduced, the driving speed is accelerated by increasing the driving voltage of first-second group 1A to 2.2V. After that, when the position of third group 1B achieves the normal position, the driving voltage of first-second group 1A is returned to the normal voltage of 2.0V. Moreover, if the position of third group 1B becomes the position P2 and below, and the group interval is increased, the driving voltage of first-second group 1A is lowered to 1.8V so as to decelerate the driving speed.

As described above, if the driving speed of first-second group 1A is controlled in which case the position of third group 1B deviates from the group interval retaining zone, the first-second group 1A and third group 1B can be simultaneously driven while avoiding the interference and excessive disjunction between the first-second group 1A and the third group 1B.

After it is determined that it is necessary to stop the first-second group 1A in step S106, the flow proceeds to step S112.

In step S112, the driving state of third group 1B is determined. Here, if the third group 1B is being stopped, the flow proceeds to step S114. On the other hand, if the third group 1B is being driven, the flow proceeds to step S114 after the flow proceeds to step S113 to stop the driving of third group 1B.

In step S114, the stop control of first-second group 1A is performed. The first-second group 1A is driven by the first-second group motor 4A of DC motor, and the rotation of first-second motor 4A is not suddenly stopped if the application of the driving voltage is stopped, causing the overrun. In order to reduce the overrun, at the start of the stop operation of first-second group 1A, the stop control for lowering the driving voltage of first-second group motor 4A is performed (reference to the timing charts of first-second group motor 4A in FIGS. 4, 5). After the stop control, the flow proceeds to step S115.

Figure 4:
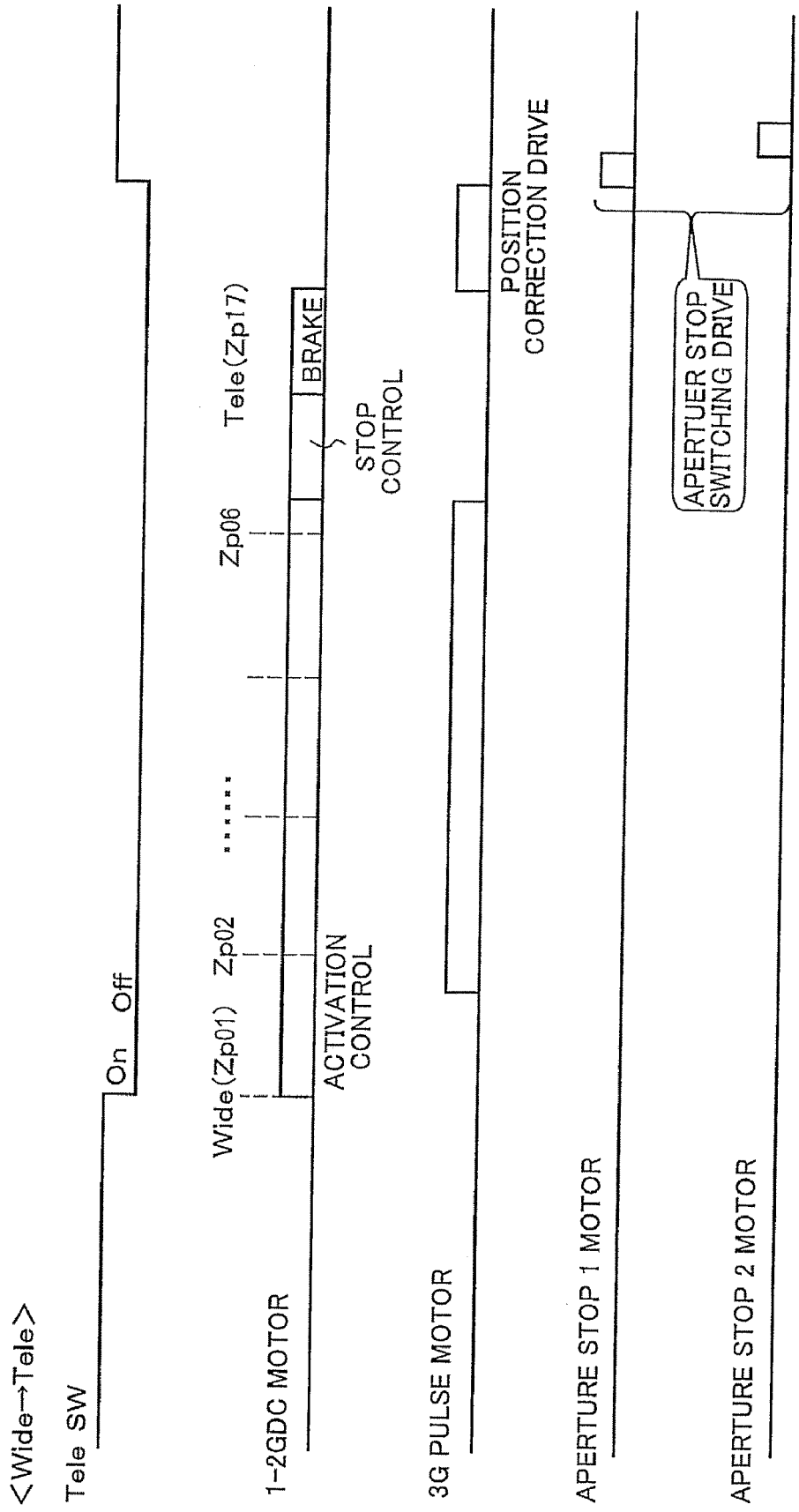
FIG. 4 is a timing chart when zooming-in at a large magnification from the wide-angle state to the telephoto state in the first embodiment of the present invention.
Figure 5:
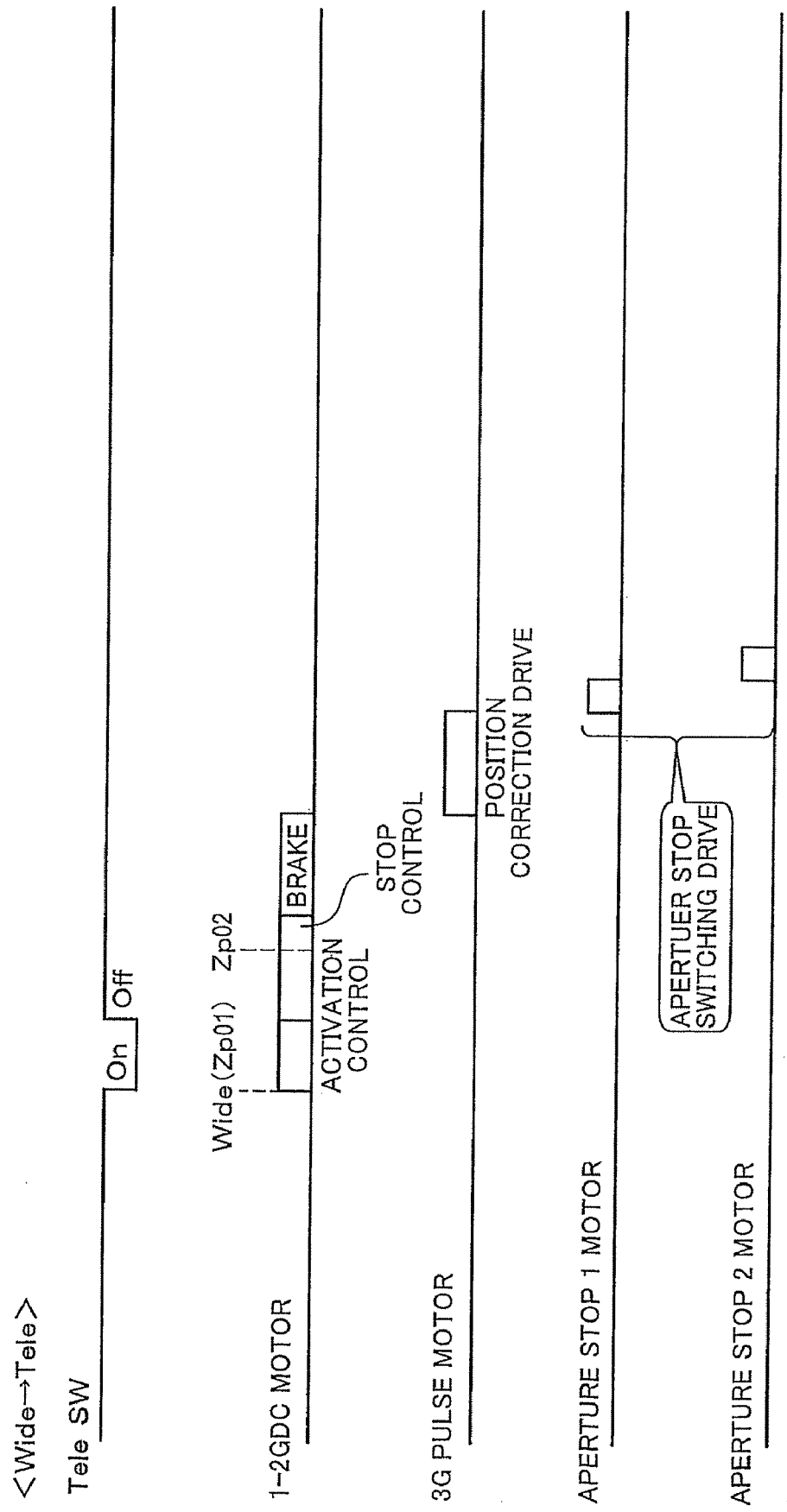
FIG. 5 is a timing chart when zooming-in at short times from the wide-angle state to the telephoto state in the first embodiment of the present invention.

In step S115, the brake control of first-second group motor 4A (general electromagnetic brake or the like) for stopping the first-second group 1A is conducted at the time when the number of pulses output from the first-second moving amount detecting device 7 reaches the predetermined number from the start of the stop control of first-second group 1A (reference to the trimming charts of first-second group motor 4A in FIGS. 4, 5). In addition, the stop position of first-second group 1A includes the overrun during the brake control. After that the flow proceeds to step S116.

In step S116, in order to perform the after mentioned backlash control for preventing a positional gap of lens groups caused by clearance of gear (not shown) provided in the driving mechanism, the driving direction of photographing lens 1 is determined. In this embodiment, if the driving direction of photographing lens 1 is from the wide-angle end to the telephoto end (WET in FIG. 3), it is determined that the backlash control is unnecessary, and the flow proceeds to step S118. If the driving direction of photographing lens 1 is from the telephoto end to the wide-angle end (TOW in FIG. 3), in this embodiment, it is determined that the backlash control is necessary, and the flow proceeds to step S117 to perform the backlash control.

In step S118, the third group 1B position correction driving control for is conducted (reference to the timing charts of third group motor 4B in FIGS. 4, 5). In this control, an appropriate stop position of third group 1B corresponding to the final position of first-second group 1A is calculated by the CPU 5B and the third group 1B is driven to that position. The calculation of this position is carried out based on the positional information of first-second group 1A and the third group 1B shown in FIG. 2. After that, the flow proceeds to step S119.

In step S119, the aperture stop driving control for setting the first aperture stop 2A and the second aperture stop 2B to aperture stop values corresponding to the positions of stopped lens groups (reference to the timing charts of first aperture stop motor 4D and the second aperture stop motor 4E of FIGS. 4, 5) is performed. After that, the flow proceeds to step S120 and the driving control of photographing lens 1 is completed.

(Driving Control from Telephoto End to Wide-Angle End)

Next, it will be explained when the photographing lens 1 is driven in the direction from the telephoto end to the wide-angle end.

If a user presses the wide-angle switch 6B for driving the photographing lens 1 from the telephoto end to the wide-angle end, so as to drive the photographing lens 1 in the driving direction from the telephoto end to the wide-angle end (T→W in FIG. 3), the flow proceeds to step S102.

Figure 6:
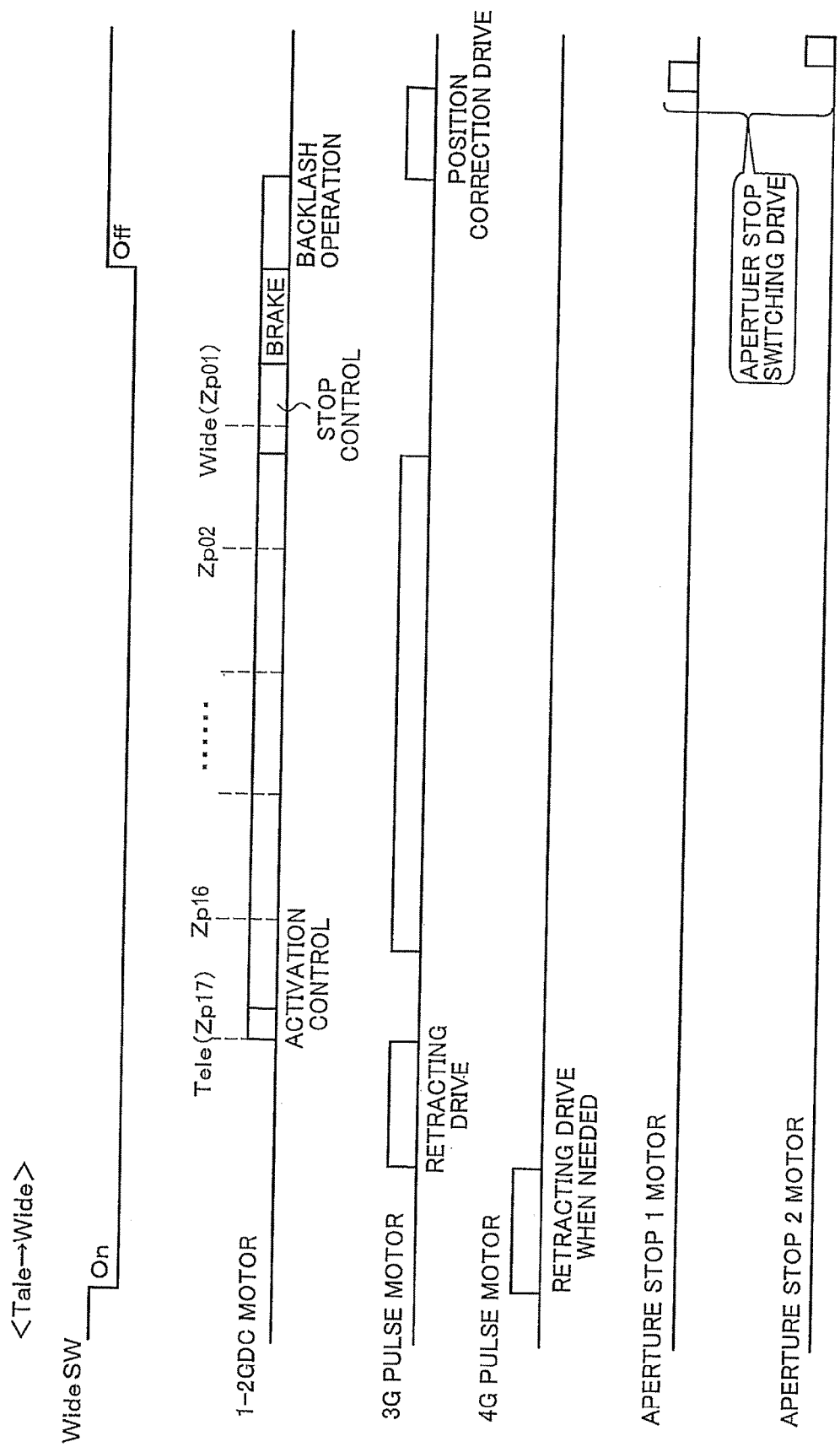
FIG. 6 is a timing chart when zooming-out at wide angle from the telephoto state to the wide-angle state in the first embodiment of the present invention.
Figure 7:
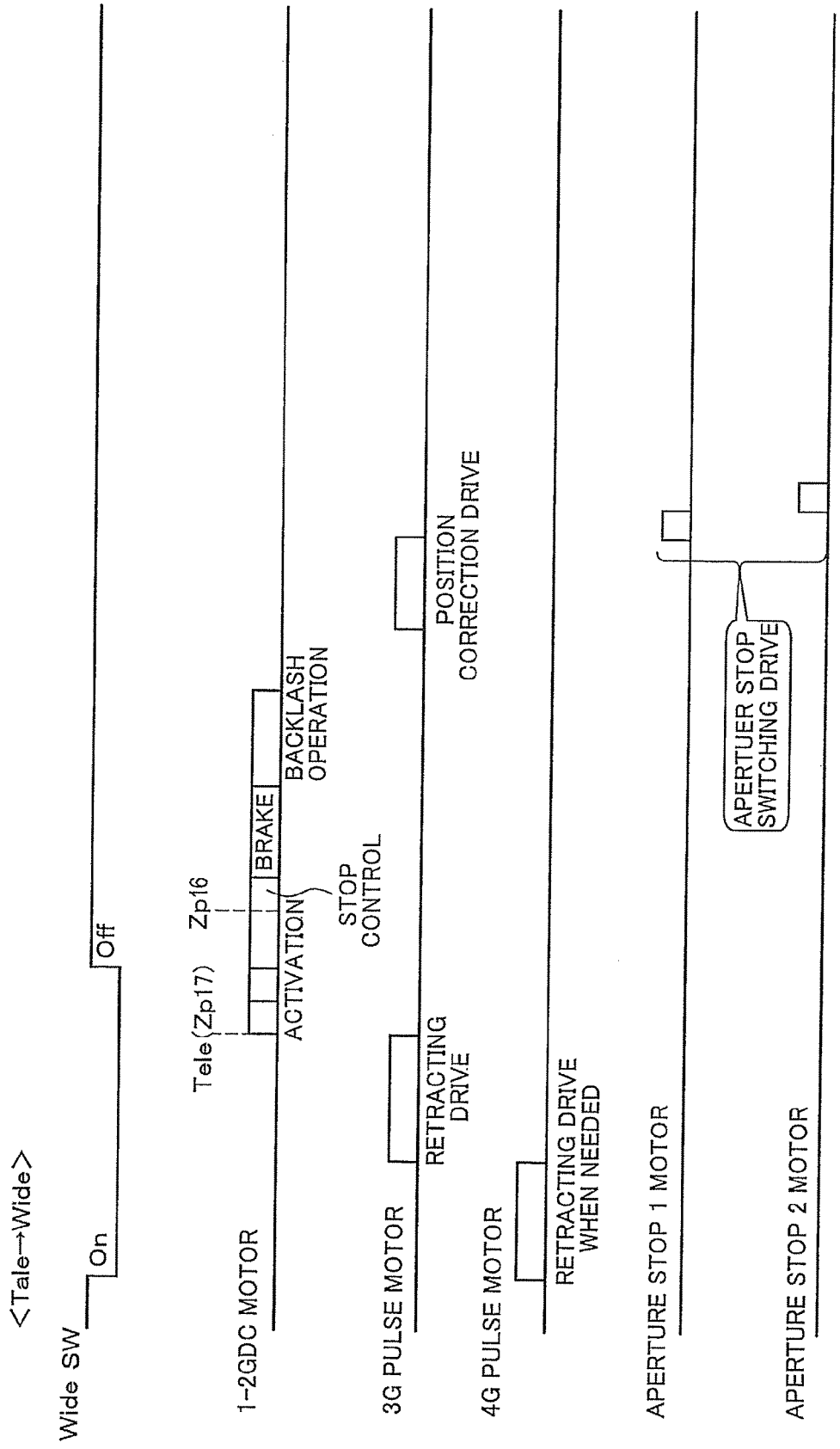
FIG. 7 is a timing chart when zooming-out at short times from the telephoto state to the wide-angle state in the first embodiment of the present invention.

In step S102, the fourth group 1C retracting driving control for distancing the fourth group 1C from the third group 1B is conducted (reference to the timing charts of fourth group motor 4C in FIGS. 6, 7). If the photographing lens 1 is driven from the telephoto end to the wide-angle end, the distance between each of the lens groups comes close to each other; thus, the fourth group 1C may interfere with the third group 1B in some cases. Accordingly, if the position of fourth group 1C is a position coming close to the third group 1B beyond a predetermined position, the fourth group retracting driving control for distancing the fourth group 1C from the third group 1B to a predetermined position that the fourth group 1C does not interfere with the third group 11B when the third group 11 is driven is performed. After that the flow proceeds to step S103.

In step S103, in order to determine the need of third group 1B retracting driving control, it is determined whether the photographing lens 1 is a state to be driven in the driving direction from the telephoto end to the wide-angle end or a state to be driven in the driving direction from the wide-angle end to the telephoto end.

If a user presses the wide-angle switch 6B for driving the photographing lens 1 from the telephoto end to wide-angle end, so as to drive the photographing lens from the telephoto end to the wide-angle end (T→W in FIG. 3), the flow proceeds to step S104.

In step S104, the third group 1B retracting driving control for distancing the third group 1B from the first-second group 1A is conducted (reference to the timing charts of third group motor 4B in FIGS. 6, 7). If the photographing lens 1 is driven from the telephoto end to the wide-angle end, the distance between each of lens groups comes close to each other; thus, the first-second group 1A may interfere with the third group 1B in some cases. Accordingly, the third group 1B retracting driving control for previously distancing the third group 1B from the first-second group 1A before driving the first-second group 1A at a predetermined distance, for example, a half distance between the zoom position Zp3(N) and the zoom position Zp3(N–1) of the third group 1B is conducted. After that, the flow proceeds to step S105.

In step S105, the driving of first-second group 1A is started by the pressed wide-angle switch 6B with the first-second group motor 4A. In this case, because the first-second group motor 4A is a DC motor, incoming current is generated right after the driving is started. Thereby, the power source voltage is decreased, affecting the battery life. In order to avoid this, the start-up control, which sets the driving voltage of first-second group motor 4A right after the start of the driving to a value lower than the driving voltage of stationary time, and raises the voltage to the voltage of stationary time after a predetermined time has passed, is performed (reference to the timing charts of the first-second group motor 4A in FIGS. 6, 7).

In step S105, after the driving of first-second group 1A is started, the flow proceeds to step S106.

In step S106, it is determined whether it is necessary to stop the first-second group 1A. Here, if it is necessary to stop the first-second group 1A, i.e., if the wide-angle switch 6B is not pressed (at the time that the wide-angle switch 6B becomes Off in FIG. 5), or if the first-second group 1A is driven to within a predetermined distance relative to the position of the maximum wide-angle side (at the time that the stop control of first-second group motor 4A is started in FIG. 6), the flow proceeds to step S112.

On the other hand, if it is not necessary to stop the first-second group 1A, the flow proceeds to step S107.

In step S107, it is determined whether the third group 1B is being stopped or being driven. If the third group 1B is being stopped, the flow proceeds to step S108. On the other hand, when the third group 1B is being driven, the flow proceeds to step S110.

In step S108, it is determined whether a predetermined time has passed after the start of driving of the first-second group 1A, in order to provide a time lag between the driving start timing of first-second group 1A and the driving start timing of third group 1B. By providing the time lag between the driving start timing of first-second group 1A and the driving start timing of third group 1B, it becomes unnecessary to simultaneously drive the first-second group motor 4A and the third group motor 4B; thus it becomes unnecessary for the power source to supply large consumption current in a short period of time. Therefore, the battery life can be extended. The determination of passing of the predetermined time is performed by counting a predetermined number of output pulses from the first-second group moving amount detecting device 7.

In step S108, after the driving of first-second group 1A is started, if the predetermined time has passed, the flow proceeds to step S109. On the other hand, after the driving of first-second 1A is started, if the predetermined time has not passed, the flow is returned to step S106, and the above flow is repeated.

In step S109, the driving of third group 1B is started by the third group motor 4B. In this case, the driving of third group 1B is conducted at a predetermined speed such that the input pulse rate of third group motor 4B becomes 600 pps, for example. After that, the flow proceeds to step S106.

In step S107, if the third group 1B is being driven, the flow proceeds to step S110. In step S110, the position of third group 1B relative to the position of first-second group 1A is found out, and it is determined whether it is necessary to vary the driving speed of first-second group 1A so as to avoid the interference and the excessive disjunction between the first-second group 1A and the third group 1B.

Here, as illustrated in FIG. 8, if the position of third group 1B is a state coming close to the position of first-second group 1A beyond the predetermined position P1 (dotted line portion A in FIG. 8) or if the position of third group 1B is a state departing from the position of first-second group 1A beyond the predetermined position P2 (dotted line portion B in FIG. 8), the flow proceeds to step Sill. On the other hand, if the third group is located between the P1 and P2, i.e., within the group interval retaining zone, relative to the first-second group 1A, the flow is returned to step S106.

In step S111, if the position of third group 1B is a state coming close to the position of first-second group 1A beyond the predetermined position P1 (dotted line portion A in FIG.

8), the first-second group 1A may interfere with the third group 1B; thus, the driving speed of first-second group 1A is accelerated at a predetermined amount so as to avoid the interference between the first-second group 1A and the third group 1B.

Moreover, if the position of third group 1B is a state departing from the first-second group 1A beyond the predetermined position P2 (dotted line portion B in FIG. 8), the distance between the first-second group 1A and the third group 1B may be excessively increased. Therefore, the driving speed of the first-second group 1A is decelerated at a predetermined amount so as to avoid the excessive disjunction between the first-second group 1A and the third group 1B.

As to the acceleration and deceleration amount, an appropriate value is calculated by the CPU 5 based on the driving speed of first-second group 1A, the position of first-second group 1A detected by the first-second group moving amount detecting device 7 and the input pulse of third group motor 4B.

FIG. 8 illustrates a schematic view of positional relationship between the first-second group 1A and the third group 1B. The zoom position Zp3 (N) for establishing a predetermined magnification is previously set relative to the zoom position Zp12(N) of first-second group 1A (reference to FIG. 2).

The position P1 of third group 1B for starting the acceleration of first-second group 1A is closer to the zoom position Zp3(N+1) of the third group 1B from the zoom position Zp3(N) of third group 1B at ⅓ between the zoom position Zp3(N) of the third group 1B and the zoom position Zp3(N+1) of third group 1B. More particularly, P1 Zp3(N)+(Zp3(N+1)−Zp3(N))/3.

Moreover, the position P2 of third group 1B for starting the deceleration of first-second group 1A is closer to the zoom position Zp3(N−2) of the third group 1B from the zoom position Zp3(N−1) of the third group 1B at ⅓ between the zoom position Zp3(N−1) and the zoom position Zp3(N−2) of the third group. More particularly, P2=Zp3 (N−1)−(Zp3 (N−1)−Zp3 (N−2))/3.

When the zoom position of third group 1B is Zp3(4)(N=4), if P1, P2 are expressed by the output pulses to the third group motor 4B shown in FIG. 2, $P1=360+(380-360)/3=366$ $P2=340+(340-320)/3=334.$ More particularly, if the zoom position of first-second group 1A is Zp(4)(N=4), if the output pulse to the third group motor 4B becomes 366 and above, the driving speed of first-second group 1A is decelerated, and if the output pulse to the third group motor 4B becomes 344 and below, the driving speed of first-second group 1A is accelerated. (Driving Speed Control by Voltage Control)

Figure 9:
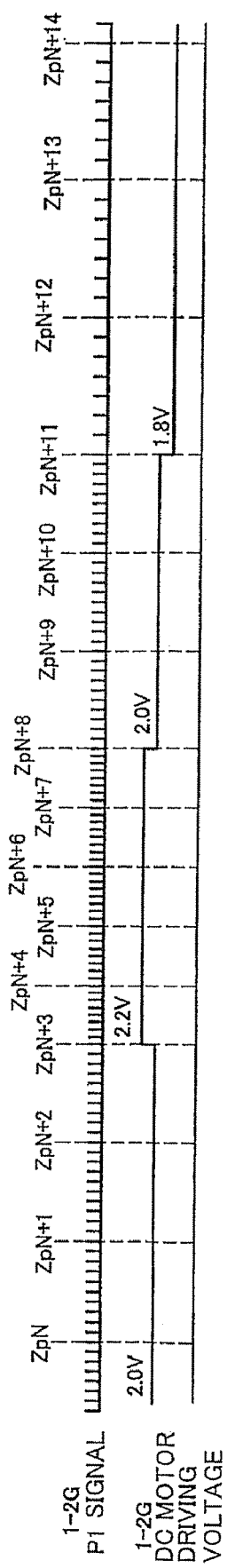
FIG. 9 is a timing chart showing driving control of a DC motor of the first embodiment for driving the first-second lens group, and showing the control by level control of driving voltage.

Here, a method of varying the driving speed of first-second group 1A by the driving voltage of first-second group 1A will be explained with reference to FIG. 9.

The first-second group 1A is driven by a normal driving voltage of 2.0V, and confirms the position of third group 1B at Zp basis. If the position of third group 1B becomes the position P2 and below and the group interval is increased, the driving speed of first-second group 1A is accelerated by increasing the driving voltage of first-second group 1A to 2.2V. After that, if the position of third group 1B reaches the normal position, the driving voltage of first-second group 1A is returned to the normal voltage. Moreover, if the position of third group 1B becomes the position P1 and above and the group interval is decreased, the driving speed of the first-second group 1A is decelerated by lowering the driving voltage to 1.8V.

As described above, if the speed of first-second group 1A is controlled in which case the position of third group 1B departs from the group interval retaining zone, the first-second group 1A and the third group 1B can be simultaneously driven while avoiding the interference between the first-second group 1A and the third group 1b.

After it is determined that it is necessary to stop the first-second group 1A in step S106, the flow proceeds to step S112.

In step S112, the driving state of third group 1B is determined. If the third group 1B is stopped, the flow proceeds to step S114. On the other hand, if the third group 1B is being driven, the flow proceeds to step S113 to stop the driving of the third group 1B and then the flow proceeds to step S114.

In step S114, the stop control of first-second group 1A is carried out. The first-second group 1A is driven by the first-second group motor 4A of a DC motor. The rotation of first-second group motor 4A is not suddenly stopped if the application of driving voltage to the first-second group motor 4A is stopped, causing the overrun. In order to reduce the amount of overrun, the stop control for lowering the driving voltage of first-second group motor 4A is performed at the time that the stop operation of first-second group 1A is started (reference to the timing charts of first-second group motors 4A in FIGS. 6, 7). After the stop control, the flow proceeds to step S115.

In step S115, at the time that the number of pulses output from the first-second group moving amount detecting device 7 reaches the predetermined number of pulses from the time that the stop control of first-second group 1A is started, the brake control (general electromagnetic brake or the like) of the first-second group motor 4A for stopping the first-second group 1A is conducted to stop the first-second group 1A (reference to the timing charts of first-second group 4A in FIGS. 6, 7). In addition, the stop position of first-second group 1A includes the overrun during the brake control. After that, the flow proceeds to step S116.

In step S116, in order to conduct the backlash control for preventing the positional deviation of the lens groups caused by the clearance of gear (not shown) provided in the driving mechanism, the driving direction of photographing lens 1 is determined. If the photographing lens 1 is driven in the direction from the telephoto end to the wide-angle end (T→W in FIG. 3), in the present embodiment, the flow proceeds to step S17 for conducting the backlash control.

In step S117, the backlash control of first-second group 1A is conducted (reference to the timing charts of first-second group motor 4A in FIGS. 6, 7). In the backlash control, after driving the first-second group 1A until it exceeds a predetermined stop position, the first-second group 1A is re-driven in the reverse direction, i.e., in the telephoto direction from the wide-angle end so as to return the first-second group 1A to a predetermined position. Because the normal driving mechanism includes the clearance of gear, an accurate position is not defined. Therefore, in order to avoid the influence of this clearance, the driving is conducted such that the driving direction of driving portion becomes constantly one direction. After the backlash control is conducted, the flow proceeds to step S118.

In step S118, the third group 1B position correction driving control (reference to the timing charts of third group motor 4B in FIGS. 6, 7) is conducted. In this control, an appropriate stop position of the third group 1B corresponding to the final position of first-second group 1A is calculated by the CPU 5B so as to drive the third group 1B to the position. The calculation of this position is conducted based on the positional information of first-second group 1A and the third group 1B shown in FIG. 2. After that, the flow proceeds to step S119.

In step S119, the aperture stop driving control is conducted for setting the first aperture stop 2A and the second aperture stop 2B to aperture stop values corresponding to the positions of stopped lens groups (reference to the trimming charts of the first aperture stop motor 4D and the second aperture stop motor 4E in FIGS. 6, 7). After that the flow proceeds to step S120 and the driving control of photographing lens 1 is completed.

In addition, the above group interval retaining zone may be different when the photographing lens 1 is driven from the wide-angle end to the telephoto end and when the photographing lens 1 is driven from the telephoto end to the wide-angle end. Moreover, the group interval retaining zone may be varied with respect to each of the zoom positions.

In the present embodiment, the backlash control is conducted when the photographing lens 1 is driven from the telephoto end to the wide-angle end, it may be carried out when the photographing lens 1 is driven from the telephoto end to the wide-angle end.

Second Embodiment

Next, the second embodiment of the present invention will be described.

(Driving Speed Control by Duty Driving Control)

The present embodiment shows a driving control method of varying the driving speed by increasing and decreasing the driving ratio of first-second group 1A according to the position of the third group 1B relative to the position of first-second group 1A, so as to simultaneously drive the first-second group 1A and the third group 1B so that the first-second group 1A does not interferer with the third group 1B.

The driving ratio according to the present embodiment is a driving output ratio within predetermined intervals; 100% is the total output, 50% is the half output and half off and 0% is the total off.

Figure 10:
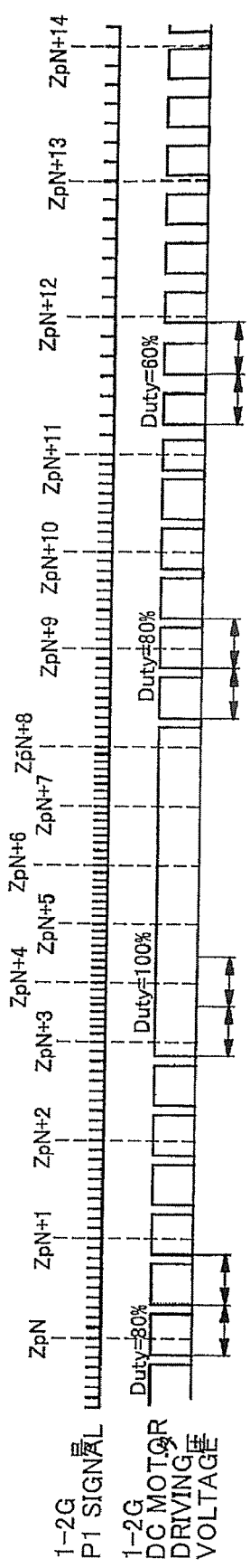
FIG. 10 is a timing chart illustrating driving control of a DC motor of the second embodiment for driving the first-second lens group and showing the control by the duty driving control of driving voltage.

In this case, the different between the present invention and the first embodiment is only the contents of step S111 in the flow chart of FIG. 3; thus, the contents of step S111 in the present embodiment will be hereinafter explained with reference to FIG. 10.

(Control from Wide-Angle End to Telephoto End)

At first, it will be explained when the photographing lens 1 is driven in the driving direction from the wide-angle end to the telephoto end. The first-second group 1A is driven at a normal driving ratio of 80% (at 10 ms intervals, 8 msON, 2 msOFF), and confirms the position of third group 1B in Zp basis. If the position of third group 1B becomes the position P1 and over, and the group interval is reduced, the driving speed is accelerated by increasing the driving ratio of first-second group 1A to 100% (at 10 ms intervals, 10 msON, 0 msOFF). After that, if the position of third group 1B reaches the normal position, the driving ratio of first-second group 1A is returned to a normal ratio of 80%. Moreover, if the position of third group 1B becomes the position P2 and below, and the group interval is increased, the driving speed is decelerated by lowering the driving ratio of first-second group 1A to 60% (at 10 ms intervals, 6 msON, 4 msOFF).

(Control from Telephoto End to Wide-Angle End)

Similarly, it will be explained when the photographing lens 1 is driven in the driving direction from the telephoto end to the wide-angle end. The first-second group 1A is driven at a normal driving ratio of 80% (at 10 ms intervals, 8 msON, 2 msOFF), and confirms the position of third group 1B. If the position of third group becomes the position P2 and below, and the group interval is increased, the driving speed is accelerated by increasing the driving ratio of first-second group 1A to 100% (at 10 ms intervals, 10 msON, 0 msOFF). After that, if the position of third group 1B reaches the normal position, the driving ratio of first-second group 1A is returned to a normal ratio of 80%. In addition, if the position of third group 1B becomes the position P1 and over, and the group interval is reduced, the driving speed is decelerated by lowing the driving ratio of first-second group 1A to 60% (at 10 ms intervals, 6 msON, 4 msOFF).

As described above, if the driving speed of first-second group 1A is controlled in which case the position of third group 1B departs from the group interval retaining zone, the first-second group 1A and the third group 1B are simultaneously driven while avoiding the interference between the first-second group 1A and the third group 1B.

Third Embodiment

Next, the third embodiment of the present invention will be described. The third embodiment shows a driving control with a combination of driving voltage control and duty driving control.

The present embodiment shows a driving control method of varying the driving speed by increasing the driving voltage when increasing the driving speed of first-second group 1A and by lowering the driving ratio when lowing the driving speed according to the position of the third group 1B relative to the position of first-second group 1A, so as to simultaneously drive the first-second group 1A and the third group 1B so that the first-second group 1A does not interfere with the third group 1B.

Figure 3:
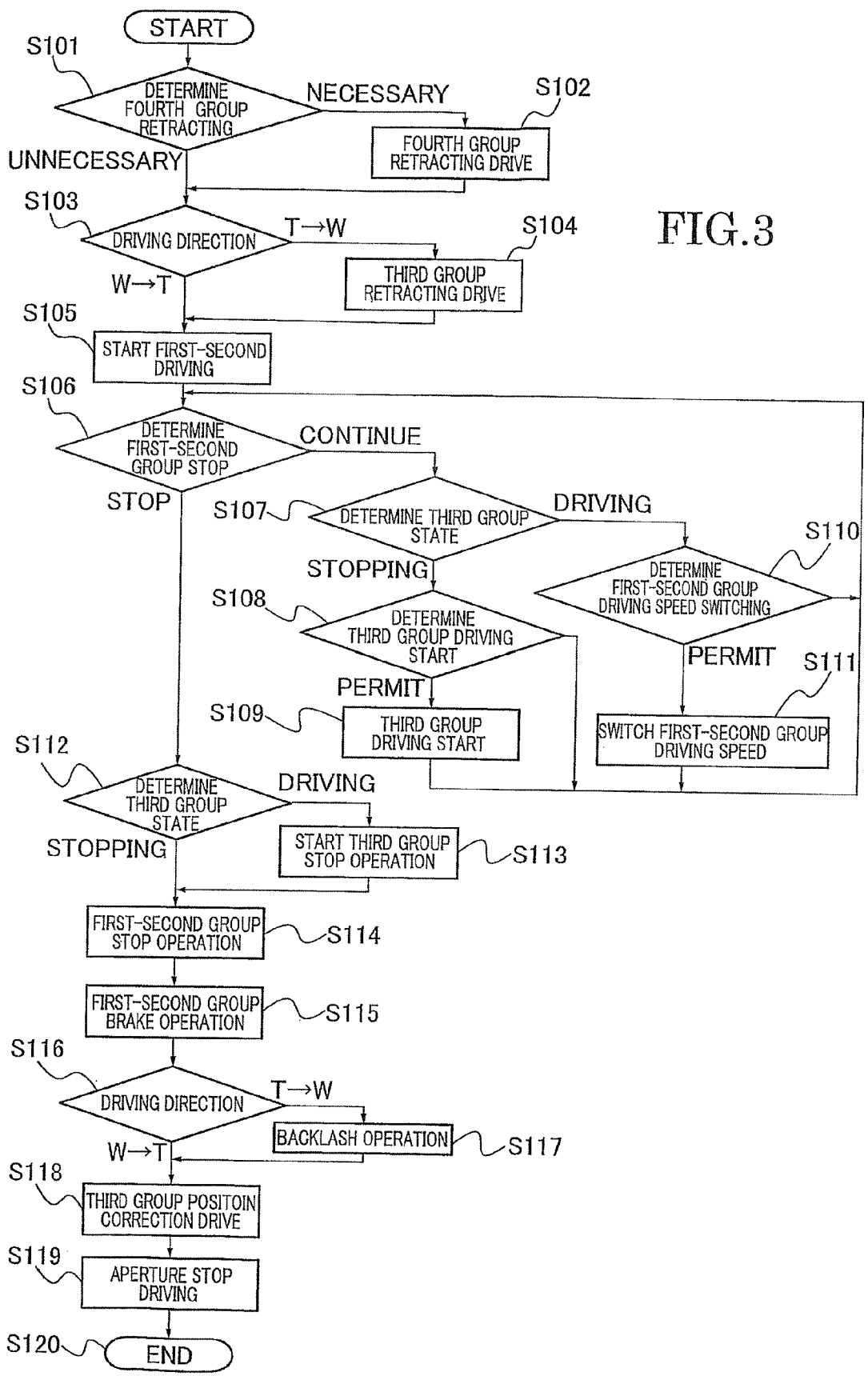
FIG. 3 is a flow chart according to the first to fourth embodiments of the present invention.

In this case, the difference between the present embodiment and the first embodiment is only the contents of step S111 in the flow chart of FIG. 3. The contents of step S111 in the present invention will be hereinafter explained with reference to FIG. 11.

(Control from Wide-Angle End to Telephoto End)

Figure 11:
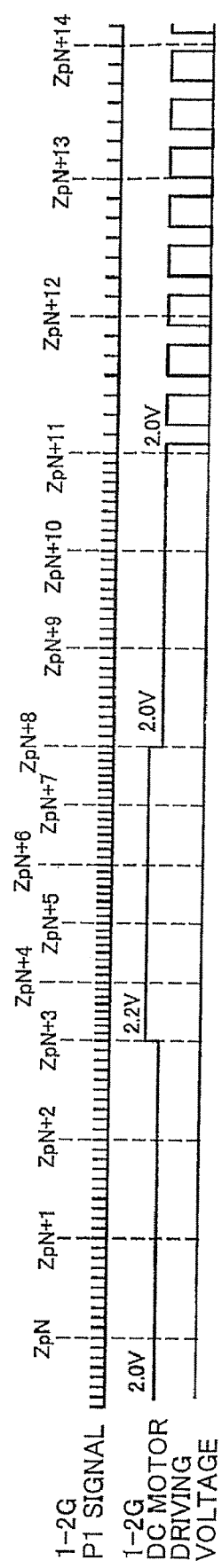
FIG. 11 is a timing chart showing a driving control of a DC motor of the third embodiment for driving the first-second fens group, and showing the control example with a combination of the level control of driving voltage and the duty driving control.

At first, it will be described when the photographing lens 1 is driven in the driving direction from the wide-angle end to the telephoto end. As illustrated in FIG. 11, the first-second, group 1A is driven at a normal driving voltage of 2.0V, and confirms the position of third group 1B in Zp basis. If the position of third group 1B becomes the position P1 and over, and the group interval is reduced, the driving speed is accelerated by increasing the driving voltage of first-second group 1A to 2.2V. After that, if the position of third group 1B reaches the normal position, the driving voltage of first-second group 1A is returned to a normal voltage of 2.0V. In addition, if the position of third group 1B becomes the position P2 and below, and the group interval is increased, the driving speed is decelerated by lowing the duty driving ratio of first-second group 1A to 60% (at 10 ms intervals, 6 msON, 4 ms OFF).

(Control from Telephoto End to Wide-Angle End)

Similarly, it will be explained when the photographing lens 1 is driven in the driving direction from the telephoto end to the wide-angle end.

The first-second group 1A is driven at a normal driving voltage of 2.0V, and confirms the position of third group 1B in Zp basis. If the position of third group 1B becomes the position P2 and below, and the group interval is increased, the driving speed is accelerated by increasing the driving voltage of first-second group 1A to 2.2V. After that, if the position of third group 1B reaches the normal position, the driving voltage of first-second group 1A is returned to the normal voltage. Moreover, if the position of third group 1B becomes the position P1 and over, the group interval is reduced, the driving speed is decelerated by lowering the duty driving ratio of the first-second group 1A to 60% (at 10 ms intervals, 6 msON, 4 msOFF).

As described above, if the driving speed of first-second group 1A is controlled with a combination of the voltage control and the duty driving control in which case the position of third group 1B departs from the group interval retaining zone, the first-second group 1A and the third group 1B are simultaneously driven while avoiding the interference between the first-second group 1A and the third group 1B.

Fourth Embodiment

Next, the fourth embodiment of the present invention will be explained. The fourth embodiment shows driving control with a combination of driving voltage control and duty driving control.

The present embodiment shows a driving control method of varying the driving speed by increasing the driving voltage when increasing the driving speed of first-second group 1A and by lowering the driving voltage and also the duty driving ratio when lowering the driving speed according to the position of third group 1B relative to the position of first-second group 1A, so as to simultaneously drive the first-second group 1A and the third group 1B so that the first-second group 1A does not interfere with the third group 1B.

Figure 12:
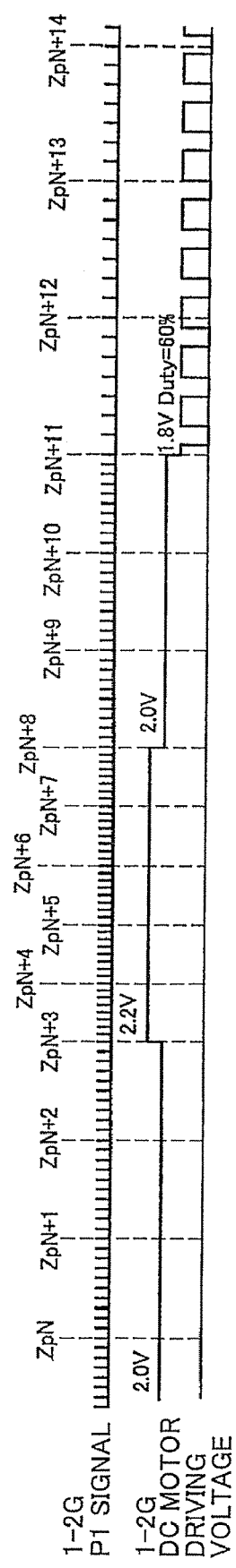
FIG. 12 is a timing chart showing driving control of a DC motor of the fourth embodiment for driving the first-second lens group, and showing the control with a combination of the level of driving voltage control and duty driving control performed by lowering a duty driving ratio and also further decreasing voltage during deceleration.

In this case, the difference between the present embodiment and the first embodiment is only the contents of step S111 in the flow chart of FIG. 3. The contents of step S111 in the present invention will be hereinafter described with reference to FIG. 12.

(Control from Wide-Angle End to Telephoto End)

At first, it will be explained when the photographing lens 1 is driven in the driving direction from the wide-angle end to the telephoto end.

The first-second group 1A is driven at a normal driving voltage of 2.0V, and confirms the position of third group 1B in Zp basis. If the position of third group 1B becomes the position P1 and over, and the group interval is reduced, the driving speed is accelerated by increasing the driving voltage of first-second group 1A to 2.2V. After that, the position of third group 1B reaches the normal position, the driving voltage of first-second group 1A is returned to the normal voltage of 2.0V. In addition, if the position of third group 1B becomes the position P2 and below, the group interval is increased, the driving speed is decelerated by lowering the driving voltage of first-second group 1A to 1.8V and lowering the duty driving ratio to 60% (at 10 ms intervals, 6 msON, 4 msOFF).

(Control from Telephoto End to Wide-Angle End)

Similarly, it will be described when the photographing lens 1 is driven in the driving direction from the telephoto end to the wide-angle end.

The first-second group 1A is driven at a normal driving voltage of 2.0V, and confirms the position of third group 1B in Zp basis. If the position of third group 1B becomes the position P2 and below, and the group interval is increased, the driving speed is accelerated by increasing the driving voltage of first-second group 1A to 2.2V. After that, if the position of third group 1B reaches the normal position, the driving voltage of first-second group 1A is returned to a normal voltage of 2.0V. In addition, if the position of third group 1B becomes the position P1 and over, and the group interval is reduced, the driving speed is decelerated by lowering the driving voltage of first-second group 1A to 1.8V and the duty driving ratio to 60% (at 10 ms intervals, 6 msON, 4 msOFF).

As stated above, if the driving speed of first-second group 1A is controlled with a combination of the voltage control and the duty driving control in which case the position of third group 1B departs from the group interval retaining zone, the first-second group 1A and the third group 1B can be simultaneously driven while avoiding the interference between the first-second group 1A and the third group 1B.

As described above, in the photographing lens driving control apparatus according to the first embodiment to the fourth embodiment, the first-second group 1A on the object side and the third group 1B of another lens group construct a combined lens group having a zooming magnification system. These lens groups 1A, 1B are configured to be driven by the driving motors 4A, 4B, 4C, respectively, and these motors 4A, 4B, 4C are controlled by the CPU 5B.

For the zoom-photographing, the first predetermined position P1 on the object side and the second predetermined position P2 on the imaging side are set in the moving area of the first-second group 1A and the third group 1B. The zone between the first predetermined position P1 and the second predetermined position P2 is set as the group interval retaining zone of the first-second group 1A and the third group 1B. This group interval retaining zone between P1 and P2 is a zone for maintaining the interval of the lens groups of zooming system when varying from the wide-angle end to the telephoto end or from the telephoto end to the wide-angle end. The first-second group 1A is provided on the object side and the third group 1B is provided on the imaging side.

In case of changing a magnification from the wide-angle end to the telephoto end, i.e., zooming in, if the third group 1B comes close to the first-second group 1A in the object side area beyond P1, the first-second group 1A is quickly moved on the object side, and if the third group 1B is moved on the imaging side beyond P2, the driving speed of first-second group 1A is decelerated.

In case of changing a magnification from the telephoto end to the wide-angle end, i.e., zooming out, if the third group 1B comes close to the first-second group 1A in the object side area from P1, the speed for moving the first-second group 1A on the imaging side is reduced, and if the third group 1B is located on the imaging side beyond P2, the first-second group 1A is quickly moved on the imaging side.

As stated above, the CPU 5B adjusts the driving speed of first-second group 1A according to the position of third group 1B relative to the first-second group 1A when adjusting the driving speed of a plurality of lens groups 1A, 1B. By this driving control, a target optical system can be achieved at short times when switching a camera from the telephoto end to the wide-angle end or from the wide-angle end to the telephoto end. In the photographing lens including a plurality of lens groups, the photographing lens driving control apparatus, which simultaneously drives each of the lens groups without causing the interference between each of the lens groups, and establishes a target optical system at short times, can be achieved, and also the out of focus state can be solved at short times when zooming in and zooming out. These are achieved by the level control of driving voltage, the control of duty driving ratio and the control with a combination of the level control and the duty driving ratio control.

The photographing lens driving control apparatus according to the embodiments of the present invention has the following effects.

According to one embodiment of the present invention, when driving the lens group on the object side, the driving speed of the lens group on the object side is adjusted according to the position of the lens group on the imaging side relative to the position of the lens group on the object side. In addition, the lens group on the object side and the lens group on the imaging side are simultaneously driven; thus, a predetermined time for establishing a target optical system can be reduced. Moreover, the lens groups are driven by the lens driving devices, respectively, so it is not necessary to use a complicated driving mechanism required for driving a plurality of lens groups by a single driving device. Accordingly, the structure can be simplified.

According to one embodiment of the present invention, since the lens group on the object side and the lens group on the imaging side are driven while maintaining a predetermined interval, the interference and excessive disjunction between the lens group on the object side and the lens group on the imaging side are not generated.

According to one embodiment of the present invention, the driving speed of the lens group on the object side can be adjusted by varying the driving voltage of the lens driving device of the lens group on the object side, so the interference and excessive disjunction between the lens group on the object side and the lens group on the imaging side are not generated.

The present application is based on and claims priority from Japanese application No. 2006-067144, filed on Mar. 13, 2006 the disclosures of which are hereby incorporated by reference herein in their entirety.

Although the present invention has been described in terms of exemplary embodiments, it is not limited thereto. It should be appreciated that variations may be made in the embodiments described by persons skilled in the art without departing from the scope of the present invention as defined by the following claims. In addition, the number, position, shape, or the like of the component are not limited to the above embodiment, and can be changed to the number, position, shape or the like of the component preferable for conducting the present invention. Moreover, no element and component in the present disclosure is intended to be dedicated to the public regardless of whether the element or component is explicitly recited in the following claims.

The invention claimed is:

1. A photographing lens driving control apparatus, comprising:
    a plurality of lens groups constituting a zooming optical system including a lens group on an object side and a lens group on an imaging side;
    a plurality of lens driving devices configured to drive the plurality of lens groups, respectively; and
    a control device configured to control the plurality of lens driving devices, wherein the control device adjusts a driving speed of the lens group on the object side according to a position of the lens group on the imaging side relative to a position of the lens group on the object side, when driving the lens group on the object side,
    wherein the control device sets a first predetermined position on the object side and sets a second predetermined position on the imaging side regarding moving positions of the lens group on the object side and the lens group on the imaging side, so as to set a group interval retaining zone of the lens group on the object side and the lens group on the imaging side between the first predetermined position and the second predetermined position,
    wherein the control device adjusts the driving speed of the lens group on the object side such that the lens group on the object side does not further come close to the lens group on the imaging side, in which case the lens group on the imaging side comes close to the lens group on the object side when the lens group on the object side is located on the object side beyond the first predetermined position, and
    wherein the control device adjusts the driving speed of the lens group on the object side such that the lens group on the imaging side does not further depart from the lens group on the object side, in which case the lens group on the imaging side is located on the imaging side beyond the second predetermined position.

2. The photographing lens driving control apparatus according to claim 1, wherein the driving speed of the lens group on the object side is adjusted by varying driving voltage for driving the lens driving device.

3. The photographing lens driving control apparatus according to claim 2, the control device increases the driving voltage of the lens driving device of the lens group on the object side in which case the lens group on the imaging side comes close to the lens group on the object side beyond the first predetermined position and lowers the driving voltage of the lens driving device of the lens group on the object side in which case the lens group on the imaging side is moved on the imaging side beyond the second predetermined position, when driving the lens group on the object side from the imaging side to the object side, wherein
    the control device lowers the driving voltage of the lens driving device of the lens group on the object side in which case the lens group on the imaging side comes close to the lens group on the object side beyond the first predetermined position and increases the driving voltage of the lens driving device of the lens group on the object side in which case the lens group on the imaging side departs from the lens group on the object side to the imaging side beyond the second predetermined position, when driving the lens group on the object side from the object side to the imaging side.

4. The photographing lens driving control apparatus according to claim 1, wherein the control device increases driving voltage of the lens driving device of the lens group on the object side in which case the lens group on the imaging side comes close to the lens group on the object side beyond the first predetermined position and lowers the driving voltage of the lens driving device of the lens group on the object side in which case the lens group on the imaging side is moved on the imaging side beyond the second predetermined position, when driving the lens group on the object side from the imaging side to the object side, wherein
    the control device lowers the driving voltage of the lens driving device of the lens group on the object side in which case the lens group on the imaging side comes close to the lens group on the object side beyond the first predetermined position and increases the driving voltage of the lens driving device of the lens group on the object side in which case the lens group on the imaging side departs from the lens group on the object side to the imaging side beyond the second predetermined position, when driving the lens group on the object side from the object side to the imaging side.

5. The photographing lens driving control apparatus according to claim 1, wherein the driving speed of the lens group on the object side is adjusted by varying a duty driving ratio of the lens driving device.

6. The photographing lens driving control apparatus according to claim 5, wherein
    the control device increases the duty driving ratio of the lens driving device of the lens group on the object side in which case the lens group on the imaging side comes close to the lens group on the object side beyond the first predetermined position and lowers a duty driving ratio of the lens driving device of the lens group on the object side in which case the lens group on the imaging side departs from the lens group on the object side beyond the second predetermined position, when driving the lens group on the object side to the object side, wherein the control device lowers the duty driving ratio of the lens driving device of the lens group on the object side in which case the lens group on the imaging side comes close to the lens group on the object side beyond the first predetermined position and increases the duty driving ratio of the lens driving device of the lens group on the object side in which case the lens group on the imaging side departs from the lens group on the object side beyond the second predetermined position, when driving the lens group to the object side on the imaging side.

7. The photographing lens driving control apparatus according to claim 1, wherein the control device increases a duty driving ratio of the lens driving device of the lens group on the object side in which case the lens group on the imaging side comes close to the lens group on the object side beyond the first predetermined position and lowers a duty driving ratio of the lens driving device of the lens group on the object side in which case the lens group on the imaging side departs from the lens group on the object side beyond the second predetermined position, when driving the lens group on the object side to the object side, wherein the control device lowers the duty driving ratio of the lens driving device of the lens group on the object side in which case the lens group on the imaging side comes close to the lens group on the object side beyond the first predetermined position and increases the duty driving ratio of the lens driving device of the lens group on the object side in which case the lens group on the imaging side departs from the lens group on the object side beyond the second predetermined position, when driving the lens group on the object side to the imaging side.

8. The photographing lens driving control apparatus according to claim 1, wherein the control device increases a driving voltage of the lens driving device of the lens group on the object side in which case the lens group on the imaging side comes close to the lens group on the object side beyond the first predetermined position and lowers a duty driving ratio of the lens driving device of the lens group on the object side in which case the lens group on the imaging side* departs from the lens group on the object side beyond the second predetermined position, when driving the lens group on the object side to the object side, wherein the control device lowers the driving voltage of the lens driving device of the lens group on the object side in which case the lens group on the imaging side comes close to the lens group on the object side beyond the first predetermined position and increases the duty driving ratio of the lens driving device of the lens group on the object side in which case the lens group on the imaging side departs from the lens group of the object side beyond the second predetermined position, when driving the lens group on the object side to the imaging side.

9. The photographing lens driving control apparatus according to claim 1, wherein the control device increases a driving voltage or a duty driving ratio of the lens driving device of the lens group on the object side in which case the lens group on the imaging side comes close to the lens group on the object side beyond the first predetermined position and lowers the driving voltage or the duty driving ratio of the lens driving device of the lens group on the object side in which case the lens group on the imaging side departs from the lens group on the object side beyond the second predetermined position, when driving the lens group on the object side to the object side, wherein control device lowers the driving voltage or the duty driving ratio of the lens driving device of the lens group on the object side in which case the lens group on the imaging side comes close to the lens group on the object side beyond the first predetermined position and increases the driving voltage or the duty driving ratio of the lens driving device of the lens group on the object side in which case the lens group on the imaging side departs from the lens group on the object side beyond, the second predetermined position, when driving the lens group on the object side to the imaging side.

10. The photographing lens driving control apparatus according to claim 1, wherein the control device increases a driving voltage and a duty driving ratio of the lens driving device of the lens group on the object side in which case the lens group on the imaging side comes close to the lens group on the object side beyond the first predetermined position and lowers the driving voltage and the duty driving ratio of the lens driving device of the lens group on the object side in which case the lens group on the imaging side departs from the lens group on the object side beyond the second predetermined position, when driving the lens group on the object side to the object side, wherein control device lowers the driving voltage and the duty driving ratio of the lens driving device of the lens group on the object side in which case the lens group on the imaging side comes close to the lens group on the object side beyond the first predetermined position and increases the driving voltage and the duty driving ratio of the lens driving device of the lens group on the object side in which case the lens group on the imaging side departs from the lens group on the object side beyond the second predetermined position, when driving the lens group on the object side to the imaging side.

11. The photographing lens driving control apparatus according to claim 1, wherein the lens driving device of the lens group on the object side is a direct current motor and the lens driving device of the lens group on the imaging side is a pulse motor.

12. An imaging device, comprising:
a plurality of lens groups constituting a zooming optical system including a lens group on an object side and a lens group on an imaging side;
a plurality of lens driving devices configured to drive the plurality of lens groups, respectively; and
a control device configured to control the plurality of lens driving devices, wherein the control device adjusts a driving speed of the lens group on the object side according to a position of the lens group on the imaging side relative to a position of the lens group on the object side, when driving the lens group on the object side,
wherein the control device is configured to set a first predetermined position on the object side and to set a second predetermined position on the imaging side regarding moving positions of the lens group on the object side and the lens group on the imaging side, so as to set a group interval retaining zone of the lens group on the object side and the lens group on the imaging side between the first predetermined position and the second predetermined position, wherein the control device adjusts the driving speed of the lens group on the object side such that the lens group on the object side does not further come close to the lens group on the imaging side, in which case the lens group on the imaging side comes close to the lens group on the object side when the lens group on the object side is located on the object side beyond the first predetermined position, and wherein the control device adjusts the driving speed of the lens group on the object side such that the lens group on the imaging side does not further depart from the lens group on the object side, in which case the lens group on the imaging side is located on the imaging side beyond the second predetermined position.

* * * * *

UNITED STATES PATENT AND TRADEMARK OFFICE
CERTIFICATE OF CORRECTION

| | |
|---|---|
| PATENT NO. | : 7,777,968 B2 |
| APPLICATION NO. | : 12/281091 |
| DATED | : August 17, 2010 |
| INVENTOR(S) | : Koichi Sugiura |

It is certified that error appears in the above-identified patent and that said Letters Patent is hereby corrected as shown below:

Column 9, lines 46-52 should read

When the zoom position of third group 1B is Zp3(4)(N=4), if P1 and P2 are expressed by the output pulse to the third group motor 4B shown in FIG. 2, P1=360+(380–360)/3= ~~336~~ <u>366</u>

P2=340–(340–320)/3=334.

Signed and Sealed this

Twenty-sixth Day of October, 2010

David J. Kappos
*Director of the United States Patent and Trademark Office*